000
United States Patent Office 2,828,345
Patented Mar. 25, 1958

2,828,345

HYDROXYPOLYOXYETHYLENE DIETHERS OF POLYOXYBUTYLENE GLYCOLS

John S. Spriggs, Midland, Mich., assignor to The Dow Chemical Company, Midland, Mich., a corporation of Delaware No Drawing. Application April 27, 1955
Serial No. 504,353

6 Claims. (Cl. 260—615)

The present invention relates to new surface active hydroxypolyoxyethylene diethers of polyoxybutylene glycols.

The new products of the invention are polyoxyalkylene diols which correspond to the following general formula:

$$HO(C_2H_4O)_y(C_4H_8O)_x(C_2H_4O)_{y'}H$$

wherein $x$ represents the number of oxybutylene groups in the compound; the sum of $y$ and $y'$ represents the number of oxyethylene groups in the compound; the molecular weight of the polyoxybutylene portion of the compound being greater than 1000 (as determined by the hydroxyl number of the polyoxybutylene glycol before oxyethylation), and the oxyethylene groups present constituting from 20 to 90 weight percent of the compound.

These products are, for the most part, a complex mixture of compounds having polyoxyalkylene chains which vary considerably in length from one molecule to another in the mixture. In other words, a given product, having some particular viscosity, and hence a definite average molecular weight, is actually a complex mixture of molecular species with a considerable spread in individual molecular weights. These products are liquids or solids, depending upon the length and oxyethylene content of the polyoxyalkylene chains of the compounds present in the mixture. They have good thermal stability, low vapor pressures, high flash points, and are miscible with a wide variety of solvents. In addition, they are stable in air, do not deposit gummy residues on heating, and are noncorrosive to metals. These compounds have good surface-active properties, and are useful generally as detergents.

Particularly advantageous products in accordance with the invention are those whose polyoxybutylene chains contribute at least 1100, and preferably from about 1200 to 2000 to the final molecular weight, and whose oxyethylene content is in the range of from about 40 up to about 80 or 90 weight percent. These compounds not only have excellent surface-active properties, but are good dispersing and emulsifying agents. The emulsifying power of some of these new compounds is indeed surprising. They form stable oil-in-water emulsions with such substances as cottonseed oil, carbon tetrachloride, mineral oil, and dimethyl phthalate rapidly and with very little mixing. They are useful as well for dispersing solids, such as pigments, in liquids, as thickening agents for aqueous media, and as blending agents. In addition to their good wetting and soil removal properties, these higher molecular weight products also have good antiredeposition properties which enhance their usefulness as detergents, especially in the laundering of textile fabrics. Those of these products which have oxyethylene contents of from 70 to 90 weight percent are flakable solids useful as detergents per se as well as in detergent compositions.

These novel products are prepared by first condensing butylene oxide with a butylene glycol to form a polyoxybutylene glycol having a molecular weight of greater than 1000, and thereafter condensing ethylene oxide with the polyoxybutylene glycol until the so prepared product has an oxyethylene content of from 20 to 90 percent by weight.

Suitable butylene oxides for use in preparing the products of the invention are those in which the oxygen atom is bonded to each of two contiguous carbon atoms, each oxide carbon atom having no more than one alkyl group attached thereto, viz., 1,2-butylene oxide, cis- and trans-2,3-butylene oxides, and mixtures of any of these.

The butylene glycol-alkylene oxide condensation is carried out under substantially moisture-free conditions at an elevated temperature in the presence of any of the usual oxide-condensation catalysts, an alkali metal hydroxide or alkoxide being preferred. The amount of catalyst employed should be from 0.1 to 1 percent by weight based on the total reactants. Reaction temperatures are in the range of from 80° to 200° C., with a temperature of about 130° C. preferred during most of the reaction. Superatmospheric pressures in the range of from 10 to 100 pounds per square inch gauge are ordinarily employed, very good results being obtained at pressures of from about 25 to 50 p. s. i. g. The alkylene oxides employed are substantially anhydrous, e. g. the moisture content of the oxides ordinarily should not exceed about 0.1 percent by weight. The alkylene oxides are also as free as practical from contaminants, such as aldehydes, which give rise to side reactions and by-product formation.

The reaction may be conducted either batch-wise or continuously as desired. In batchwise operation, the commercially anhydrous butylene glycol is charged into a suitable dry reaction vessel, such as an autoclave, and mixed with an effective amount of catalyst, usually about 0.3 percent by weight of potassium hydroxide in terms of the total amount of reactants. Prior to the introduction of butylene oxide, the reaction vessel is advantageously flushed with a stream of dry inert gas, such as nitrogen, to remove any air or oxygen therefrom. The elimination of molecular oxygen from the reaction vessel is an important factor in obtaining colorless products and may, if desired, be carried out after adding the butylene glycol and catalyst to the reaction vessel.

After these preliminaries, the butylene glycol-potassium hydroxide mixture is heated to a reaction temperature of about 130° C. and butylene oxide is added at a fairly rapid rate. Usually the rate of addition of butylene oxide is such as to maintain a pressure of about 35 p. s. i. g. in the reactor. Vigorous agitation is desirable to maintain a good dispersion of catalyst and uniform reaction rates throughout the mass. The reaction of butylene oxide with butylene glycol is exothermic and it is therefore necessary to provide adequate cooling means. By controlling the rate of addition of butylene oxide to maintain the pressure fairly constant, the reaction temperature may also be maintained constant. The addition of butylene oxide is stopped upon obtaining the desired molecular weight of the polyoxybutylene glycol condensation product as determined by hydroxyl analysis, reckoning two free hydroxyl groups per molecule. Thereafter, ethylene oxide is condensed with the polyoxybutylene glycol condensation product to give a product in accordance with the invention. The addition of ethylene oxide is carried out in the same manner as the addition of butylene oxide already described. The resulting product is a surface-active material and may be employed per se. Prior to use, it may, if desired, be rendered neutral with dilute acid. It may also be purified somewhat by heating it at a reduced pressure under reflux to distill off any low boiling material. Following topping under vacuum, the product, while still warm, may be filtered, if necessary, to clarify it.

EXAMPLE 1

The preparation of hydroxypolyoxyethylene diethers of polyoxybutylene glycols in accordance with the invention is hereinafter described.

*Preparation of polyoxybutylene glycol intermediate*

A

Into a 10 gallon steel reaction vessel was charged 10.0 pounds of commercial anhydrous monobutylene glycol and 0.3 pound of potassium hydroxide pellets. The air was then evacuated from the vessel and replaced with dry nitrogen gas. Thereupon the vessel and its contents was heated to 130° C. and a mixture of straight chain butylene oxides consisting approximately of 90 percent by weight of 1,2-butylene oxide and 10 percent of 2,3-butylene oxides and containing less than 0.1 weight percent water was added gradually to the well-agitated monobutylene glycol-potassium hydroxide mixture. The rate of addition of butylene oxides was such as to maintain a reaction temperature of approximately 130° C., the addition being continued until 92.0 pounds of butylene oxides had been introduced. Following the addition of all of the butylene oxides, the temperature of the reaction mixture was maintained at 130° C. until the pressure in the vessel had fallen off to about one atmosphere, i. e. until substantially all of the butylene oxides had been reacted. Thereafter, the reaction mixture was heated under distillative reflux at about 30 millimeters of mercury absolute pressure for one-half hour to remove low boiling materials. A sample of the residual polyoxybutylene glycol product was found to have an average molecular weight of 695 as calculated from the hydroxyl value, reckoning two free hydroxyl groups per molecule.

A mixture of 46.5 pounds of the unneutralized polyoxybutylene glycol product of 477 average molecular weight further catalyzed with about 0.2 pound of KOH pellets was additionally reacted at a temperature of 130° C. with 57 pounds of the aforesaid mixed butylene oxides as described in the preceding paragraph. The polyoxybutylene glycol product so prepared was found to have an average molecular weight of 1138 as calculated from the hydroxyl value. Based on the combined runs, approximately 17.4 pounds of mixed butylene oxides were reacted per pound of monobutylene glycol initially charged.

*Addition of ethylene oxide to polyoxybutylene glycol intermediate*

B

Several portions of the unneutralized polyoxybutylene glycol intermediate product of 1138 average molecular weight from part A above were reacted with ethylene oxide to give products having oxyethylene contents (based on the ethylene oxide reacted) equal to the weight percentages shown in Table I for runs 1A to 1F inclusive. The respective runs were all carried out in accordance with the general procedure described in part A of this example. In each run, additional KOH was employed in an amount sufficient to bring the catalyst concentration up to 0.3 percent based on the weight of the final product. The oxyethylene content of each of the polyoxyethylated products so prepared (as calculated from the amount of ethylene oxide consumed in the reaction) is given in Table I.

EXAMPLE 2

Three polyoxybutylene glycol intermediate products having average molecular weights by hydroxyl analyses of 1421, 1600, and 1822 were prepared by reacting approximately 21.0, 24.6, and 30.4 parts by weight respectively of mixed chain butylene oxides per part of monobutylene glycol in accordance with the same general procedure described in part A of Example 1. Portions of the unneutralized polyoxybutylene glycol intermediate products so prepared were reacted with ethylene oxide to give products having oxyethylene contents (based on the ethylene oxide reacted) corresponding to the weight percentages given in Table I for runs 2A to F, 3, and 4. In each of the runs, sufficient KOH was employed to give a concentration of 0.3 percent based on the weight of the final product.

Table I also gives some of the properties of the final surface-active products of the various runs of Examples 1 and 2, viz., physical state, surface-tension, interfacial tension, foaming, wetting time, and solubility temperature. With the exception of physical state, the properties are those of 0.10 weight percent solutions of the products in distilled water. Surface tensions in dynes per centimeter are corrected values as determined with the Cenco-Du Nuoy Interfacial Tensiometer (Model 70540) and corrected by the Zuidema-Waters formula (Ind. and Eng. Chem., anal. Ed., 13, 312–313). Interfacial tensions in dynes per centimeter are those of five-minute-old interfaces of 0.10 weight percent water solutions of the products against mineral oil. Foaming is a measure of the foam heights at zero time and after five minutes as determined by the Ross-Miles Method (Oil and Soap 18, 99–102). Wetting times in minutes were determined by the Draves Test, Synthron modification (Synthron, Inc., Technical Bulletin "Evaluation of Surface Active Agents," November 1949). Solubility temperatures in degrees centigrade are the temperatures at which the 0.10 weight percent water solutions become turbid.

TABLE I

| Run | Mol. Wt. of Polyoxybutylene Glycol by OH | Wt. Percent Oxyethylene Content of Final Product | Physical State | Surface Tension, Dynes/cm. | Interfacial Tension, Dynes/cm. | Foaming | | Wetting Time, Min. | Solubility Temp., °C. |
|---|---|---|---|---|---|---|---|---|---|
| | | | | | | $t=0$ mm. | $t=5$ mm. | | |
| 1-A | 1,138 | 40 | SW | 33.1 | 3.6 | 24 | 21 | 2.04 | 0− |
| 1-B | 1,138 | 50 | SW | 32.8 | 3.3 | 39 | 36 | 1.35 | 0− |
| 1-C | 1,138 | 55 | SW | 32.8 | 3.1 | 43 | 42 | 1.39 | 0− |
| 1-D | 1,138 | 60 | W | 33.1 | 3.4 | 52 | 44 | 1.35 | 76 |
| 1-E | 1,138 | 70 | FW | 34.4 | 4.7 | 78 | 75 | 1.80 | 86 |
| 1-F | 1,138 | 80 | FW | 37.4 | 7.4 | 78 | 78 | 3.24 | 100+ |
| 2-A | 1,421 | 40 | SW | 35.5 | 7.1 | 12 | 8 | 5.71 | 0− |
| 2-B | 1,421 | 50 | SW | 35.5 | 6.5 | 29 | 21 | 2.58 | 0− |
| 2-C | 1,421 | 55 | SW | 35.5 | 6.3 | 38 | 32 | 4.10 | 0− |
| 2-D | 1,421 | 60 | W | 36.0 | 7.1 | 49 | 38 | 4.29 | 87 |
| 2-E | 1,421 | 70 | FS | 37.6 | 9.0 | 62 | 60 | 5.85 | 88 |
| 2-F | 1,421 | 80 | FS | 40.6 | 13.0 | 55 | 53 | 9.90 | 100+ |
| 3 | 1,600 | 80 | FS | 40.2 | 13.5 | 68 | 68 | 7.71 | 100+ |
| 4 | 1,822 | 80 | FS | 41.3 | 12.5 | 58 | 58 | 9.22 | 100+ |

Legend: SW—soft wax; W—waxy; FW—firm wax; FS—flakable solid.

EXAMPLE 3

The remarkably good detergent properties of the products of the invention will be apparent from their high carbon soil removal values as determined by the following test.

The carbon soil removal test was carried out by washing swatches of standard soiled cotton fabric for 20 minutes at a temperature of 120° F. in a standard laundering test machine, viz., a "Launder-Ometer" manufactured by Atlas Electric Devices Company. The washing operation in the Launder-Ometer was conducted in quadruplicate in pint-size glass jars, each jar containing fifteen ¼ inch diameter stainless steel balls, a swatch of each of the two standard soil cloths hereinafter described, and a 100 milliliter portion of a 2 gram per liter solution of the detergent composition dissolved in water of 150 parts per million hardness. The test detergent composition consisted of 20 parts by weight of the material to be evaluated for carbon soil removal, viz., one of the products of the invention, and in addition thereto, 50 parts of sodium tripolyphosphate, 27.5 parts of sodium sulfate, and 2.5 parts of sodium carboxymethocellulose. For purpose of comparison, an outstanding, widely-accepted, household synthetic detergent composition was also run as a standard. The standard soiled swatches were an "ACH" soiled swatch and a "dry" soiled swatch, each of which measured 2.5 by 3 inches. The "ACH" (Type 114) swatch, purchased from American Conditioning House, Boston, Massachusetts, was soiled with a carbon black-mineral oil mixture. The "dry" soiled swatch was made by dispersing vacuum cleaner dirt in a washing machine and agitating desized Indian Head muslin in the dispersion.

After washing in the Launder-Ometer for 20 minutes at a temperature of 120° F., the test swatches were removed from the one-pint jars, transferred to one-liter flasks, and rinsed for 5 minutes in water of 150 parts per million hardness. The rinsing operation was carried out under conditions of good agitation by continuously recycling a total of 3 liters of the aforesaid rinse water through each flask. Thereafter the rinsed swatches were removed, dried, and both sides of each swatch measured for reflectance with a Photovolt Reflectance Meter, Model 610. Since four duplicate runs were carried out for each detergent composition tested, a total of eight reflectance measurements were made for each and the values thus obtained averaged for each type of swatch.

The percent carbon soil removal value was then calculated for the test detergent composition by subtracting (a) the reflectance of the soiled swatch from (b) the reflectance of the soiled swatch after washing, and then multiplying the result by 100 and dividing it by the difference between (c) the reflectance of an unsoiled swatch after washing in a solution of the standard commercial detergent composition with no soil present and (d) the reflectance of the soiled swatch. These carbon soil removal values are hereinafter reported in Table II, column 4, as percentage of that of the standard commercial detergent composition, i. e. the percent carbon soil removed with the test detergent composition was divided by the the percent carbon soil removed with the standard detergent composition, and multiplied by 100.

Carbon soil removal values are reported in column 4 of Table II (as percentages of standard as above-described) for some of the products of Examples 1 and 2, said products being identified in col. 1 of Table II according to the same run numbers which were previously assigned them in Table I. In addition to the identifying run numbers, the products reported in Table II are further identified by the average molecular weights of the polyoxybutylene glycols from which they were prepared (col. 2) and by the weight percent oxyethylene content of the final product (col. 3).

TABLE II

| Product | Mol. Wt. of Polyoxybutylene Glycol by OH | Wt. Percent Oxyethylene Content of Final Product | Carbon Soil Removal Value (Percentage of Standard). | |
|---|---|---|---|---|
| | | | ACH | Dry |
| 1-A | 1,138 | 40 | | |
| 1-B | 1,138 | 50 | 104 | 110 |
| 1-C | 1,138 | 55 | 101 | 128 |
| 1-D | 1,138 | 60 | 106 | 129 |
| 1-E | 1,138 | 70 | 105 | 114 |
| 1-F | 1,138 | 80 | 99 | 104 |
| 2-A | 1,421 | 40 | 93 | 99 |
| 2-B | 1,421 | 50 | 95 | 95 |
| 2-C | 1,421 | 55 | 96 | 95 |
| 2-D | 1,421 | 60 | 104 | 102 |
| 2-E | 1,421 | 70 | 106 | 105 |
| 2-F | 1,421 | 80 | 103 | 101 |

EXAMPLE 4

In addition to being outstanding detergents for textile fabrics by virtue of their good soil removal properties during laundering operations, the products of the invention are unusually good dispersing agents as well, and therefore maintain soil suspended once it is removed. This ability to suspend soil and thereby prevent its redeposition on clothes during laundering is clearly evident from the redeposition values obtained in the following test.

The test for determining redeposition values was carried out similarly to the carbon soil removal test described in the preceding example. In this test, however, an unsoiled test swatch was placed in the pint jar along with the two standard soil swatches, the rest of the test procedure being identical. Loss of brightness values were then calculated by subtracting (a) the reflectance of the unsoiled swatch after washing in the presence of the two soiled swatches from (d) the reflectance of the unsoiled swatch after washing in a solution of the commercial detergent composition with no soil present. Redeposition values were then calculated from the loss of brightness values by dividing the loss of brightness value obtained with the test detergent composition by that obtained with the commercial detergent composition, and multiplying by 100. The lower the redeposition value, the better the performance of the test detergent composition in this respect.

In Table III below are the redeposition values for 2 typical hydroxypolyoxyethylene diethers of polyoxybutylene glycol products in accordance with the invention, viz., the products of runs 1–C and 2–C as shown in Table I. For purposes of comparison, the redeposition value is also given for a product "Q" not according to the invention, viz., a hydroxypolyoxyethylene diether of a polyoxybutylene glycol product prepared in accordance with the procedure of Example 1 but having an average molecular weight attributable to the polyoxybutylene glycol portion prior to polyoxyethylation of only 962 as determined by hydroxyl.

TABLE III

| Product | Mol. Wt. of Polyoxybutylene Glycol by OH | Wt. Percent Oxy-Ethylene Content of Final Product | Redeposition Value |
|---|---|---|---|
| 2-C | 1,421 | 55 | 35 |
| 1-C | 1,138 | 55 | 30 |
| Q | 962 | 55 | 55 |

EXAMPLE 5

In the following series of tests, the products of the invention are shown to be highly effective for emulsifying mineral oil in water.

These emulsification tests were carried out by first dissolving in 30 grams of light mineral oil, 2 grams of the compound to be tested as an emulsifying agent, and then shaking the solution so prepared with 65 milliliters of distilled water. The shaking operation was carried out under carefully controlled conditions on a mechanical shaker for a given period of time. After standing overnight, the stability of the emulsion was noted and qualitatively rated. All of the surface-active compounds of Runs 1 and 2 of Table 1 (in accordance with the invention) were found to be good emulsifiers according to the preceding test procedure.

That which is claimed is:

1. A hydroxypolyoxyethylene diether of a polyoxybutylene glycol wherein the polyoxybutylene portion of the compound contributes greater than 1000 but not more than about 2000 to its molecular weight and the polyoxyethylene portions contribute from 20 to 90 percent by weight of the compound.

2. Hydroxypolyoxyethylene diethers of polyoxybutylene glycols, said compounds corresponding to the formula:

$$HO(C_2H_4O)_y(C_4H_8O)_x(C_2H_4O)_{y'}H$$

wherein $x$ represents the number of oxybutylene groups in the compounds; the sum of $y$ and $y'$ represents the number of oxyethylene groups in the compounds; the average molecular weights of the compounds, exclusive of the oxyethylene groups, being from about 1100 to about 2000 as determined from the hydroxyl number of the polyoxybutylene glycol portion before polyoxyethylation; and the oxyethylene groups present constituting from 20 to 90 weight percent of the compounds.

3. Hydroxypolyoxyethylene diethers of polyoxybutylene glycols according to claim 2 having average molecular weights, exclusive of the oxyethylene groups, of at least 1200.

4. Hydroxypolyoxyethylene diethers of polyoxybutylene glycols according to claim 3 wherein the oxyethylene groups present constitute from 40 to 80 weight percent of the compounds.

5. As emulsifiers for forming oil-in-water-type emulsions, mixtures of hydroxypolyoxyethylene diethers of polyoxybutylene glycols, said compounds having average molecular weights, exclusive of the polyoxyethylene portions, of from 1200 to 2000 as determined by hydroxyl number of the polyoxybutylene glycol before polyoxyethylation, the polyoxyethylene portions constituting from 40 to 80 percent by weight of the compounds in the mixture.

6. As flakable solid detergents, mixtures of hydroxypolyoxyethylene diethers of polyoxybutylene glycols, said compounds having average molecular weights, exclusive of the polyoxyethylene portions, of from 1200 to 2000 as determined by hydroxyl number of the polyoxybutylene portions prior to polyoxyethylation, the polyoxyethylene portions constituting from 70 to 90 percent by weight of the compounds in the mixture.

References Cited in the file of this patent

UNITED STATES PATENTS

| | | |
|---|---|---|
| 2,174,761 | Schuette et al. | Oct. 3, 1939 |
| 2,674,619 | Lundsted | Apr. 6, 1954 |